Sept. 22, 1959    S. G. ESKIN    2,905,389
THERMOSTATIC GAS VALVE
Filed Feb. 4, 1957    3 Sheets-Sheet 1
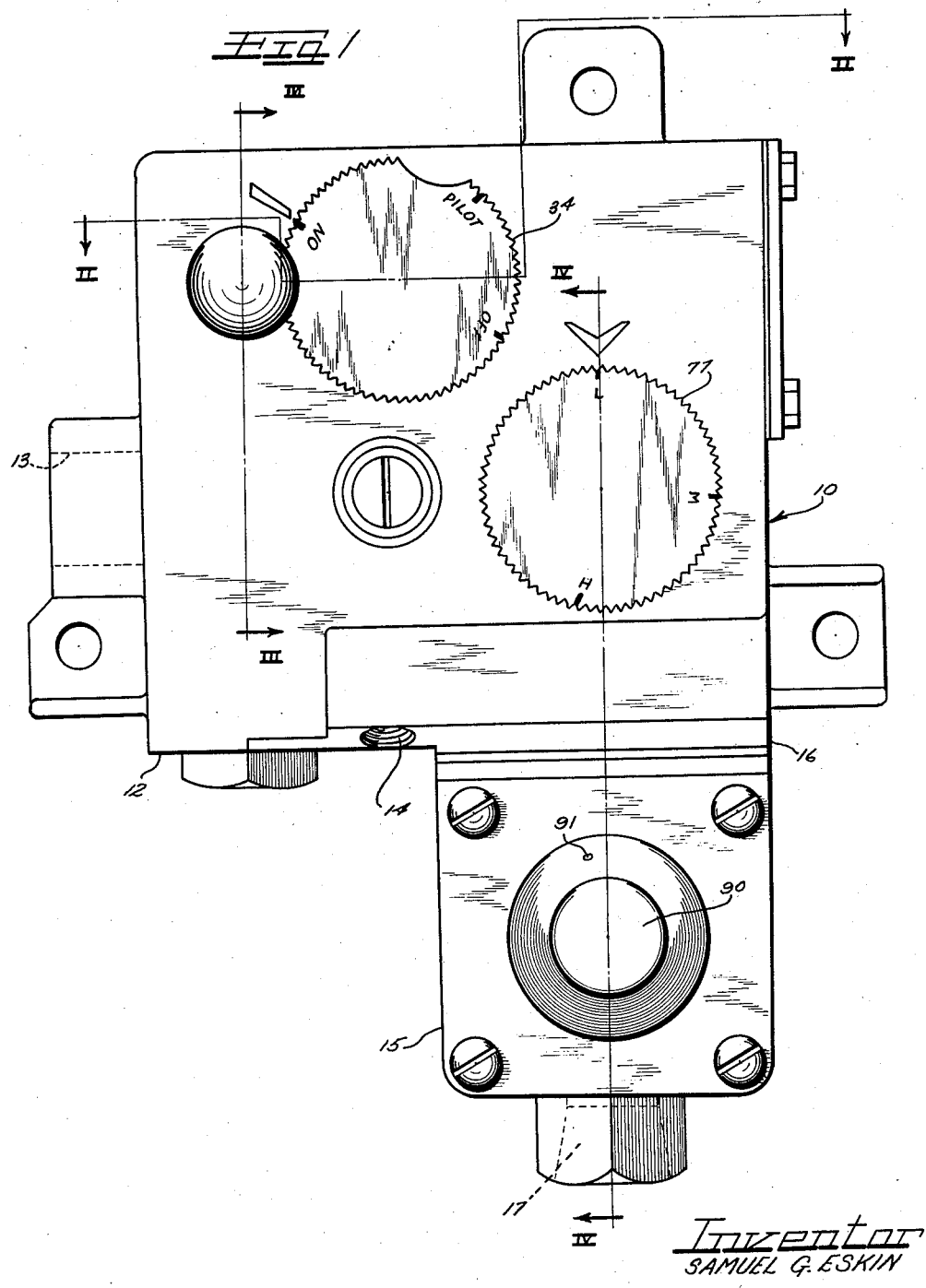
Inventor
SAMUEL G. ESKIN Sept. 22, 1959     S. G. ESKIN     2,905,389
THERMOSTATIC GAS VALVE
Filed Feb. 4, 1957     3 Sheets-Sheet 2
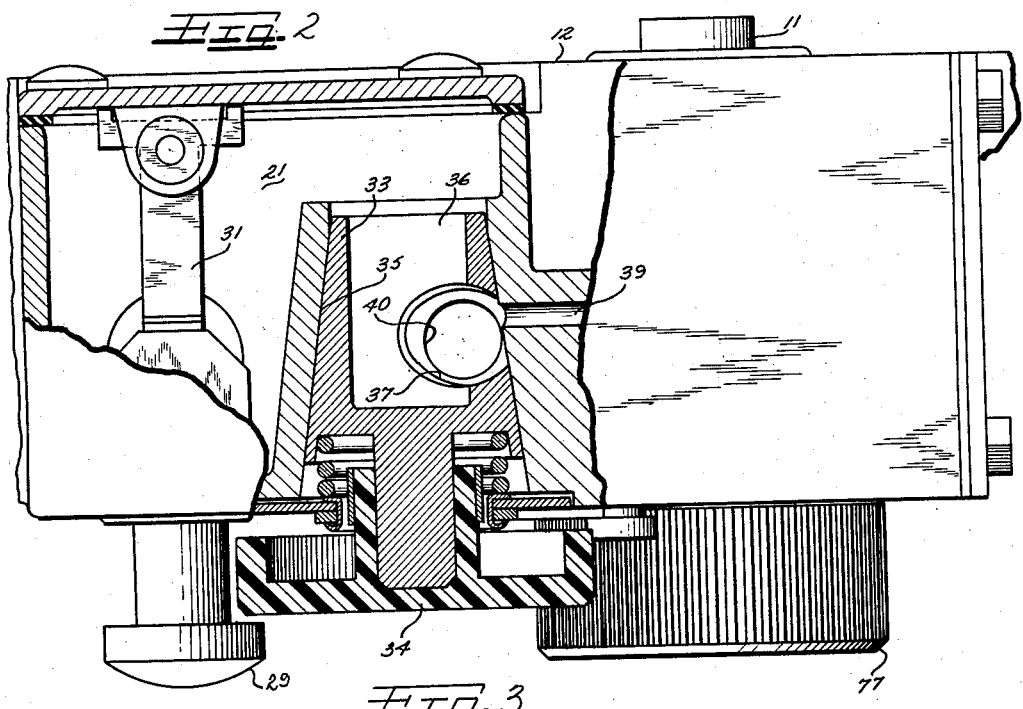
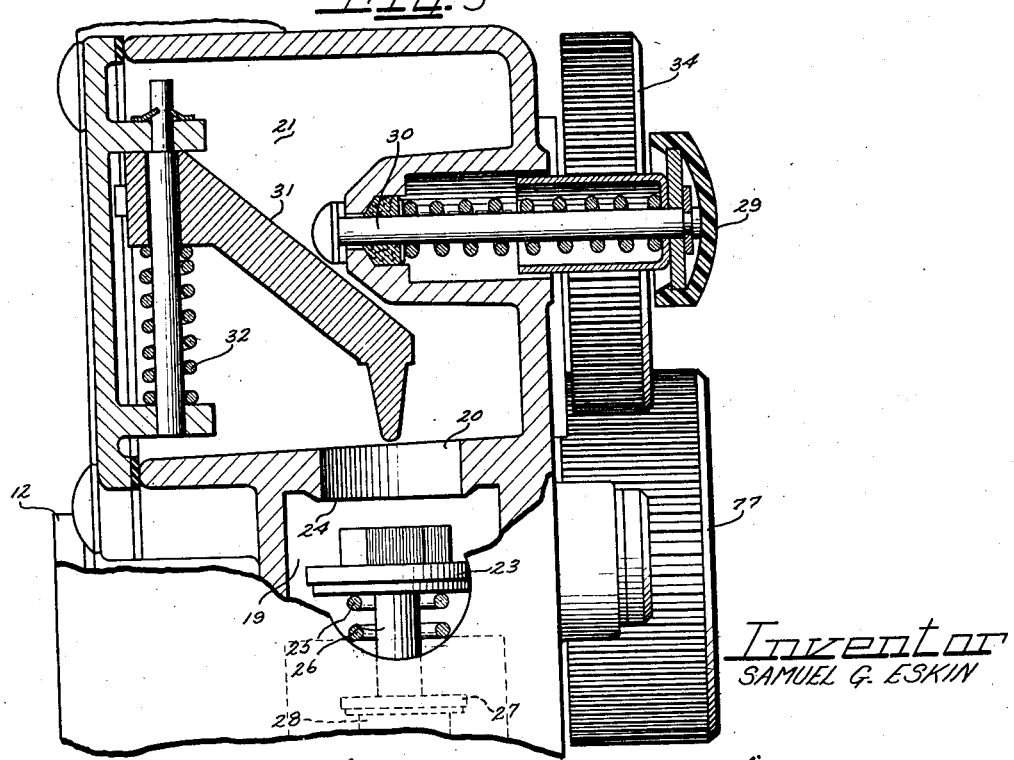
Inventor
SAMUEL G. ESKIN
By Hill, Sherman, Meroni, Gross & Simpson Attys

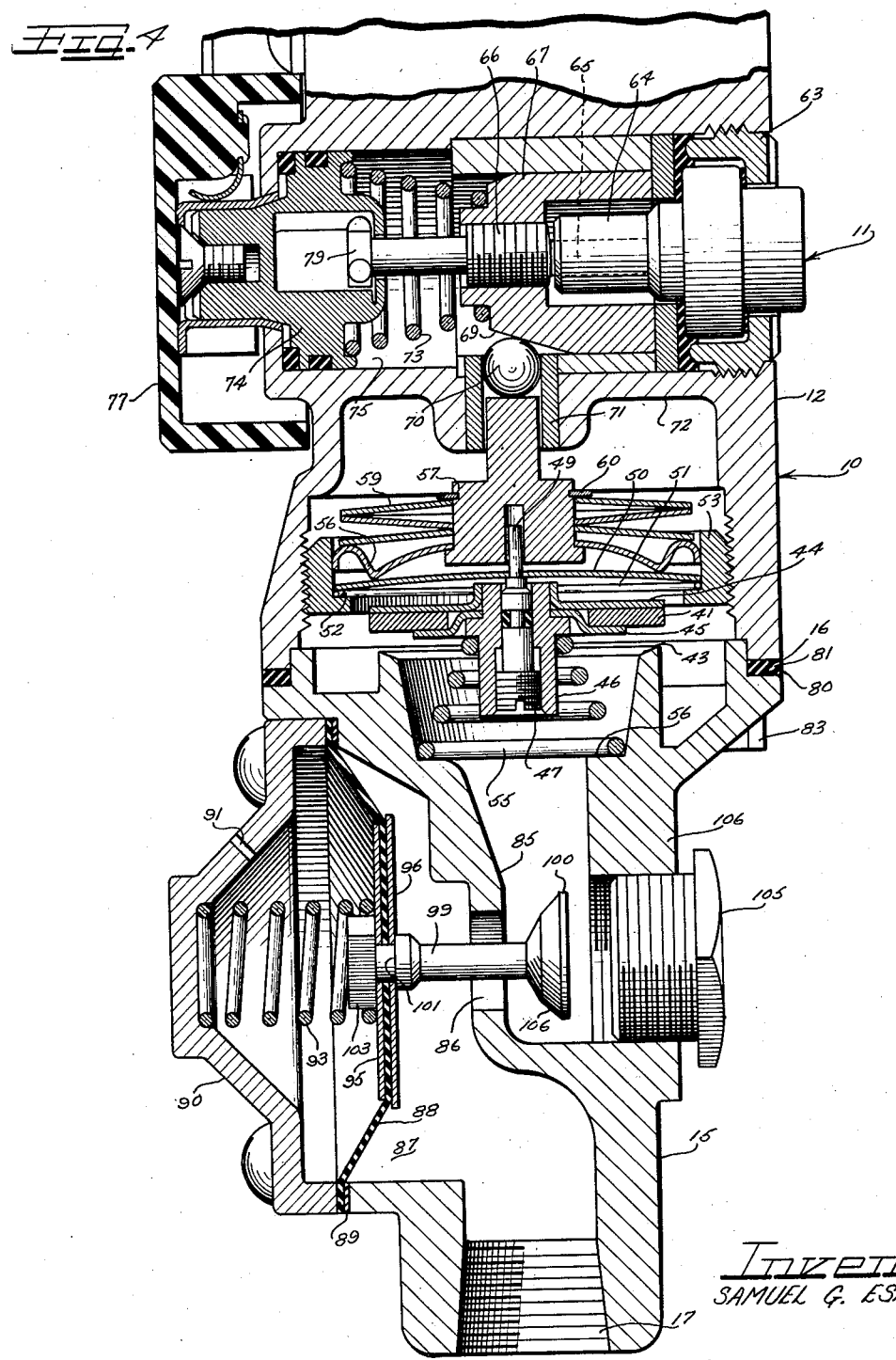

2,905,389
Patented Sept. 22, 1959

2,905,389
THERMOSTATIC GAS VALVE

Samuel G. Eskin, Chicago, Ill., assignor to The Dole Valve Company, Chicago, Ill., a corporation of Illinois Application February 4, 1957, Serial No. 638,013

3 Claims. (Cl. 236—92)

This invention relates to improvements in thermostatic gas valves and more particularly relates to such valves as control the flow of gas to a main gas burner.

A principal object of the invention is to provide a novel and improved form of thermostatic gas valve having a pressure and temperature regulated flow of gas through the valve outlet.

A further object of the invention is to provide a thermostatic gas valve shutting off at a selected temperature, in which a pressure regulator valve in series therewith regulates the pressure of the gas discharged through the outlet from the valve.

A still further object of the invention is to provide an efficient form of hot water heater gas valve utilizing a thermostatic valve for shutting off the valve at the adjusted temperature of the thermostat and controlling the flow of gas through the valve outlet by a pressure operated regulator valve in series with the thermostatic valve, closing as the gas pressure exceeds a predetermined safe pressure for the gas burner.

A still further object of the invention is to provide a unitary pressure regulator in the form of a fitting for attachment to a thermostatic valve and having a valve seat for a main thermostatically controlled gas valve as a part thereof.

A still further object of the invention is to provide a pressure regulator which may form an outlet fitting for a thermostatic gas valve, and which may be attached to the body thereof and form a valve seat therefor and provide pressure regulation as well as thermostatic control for the main flow of gas through the outlet from the valve.

These and other objects of the invention will appear from time to time as the following specification proceeds and with reference to the accompanying drawing wherein:

Figure 1 is a plan view of a valve constructed in accordance with the invention;

Figure 2 is a sectional view taken substantially along line II—II of Figure 1 and showing the main gas cock for admitting gas to the thermostatic valve;

Figure 3 is a fragmentary sectional view taken substantially along line III—III of Figure 1, illustrating the safety shut-off valve controlling the admission of gas to the main gas cock; and Figure 4 is a fragmentary sectional view taken substantially along line IV—IV of Figure 1 and illustrating the thermostatic shut-off valve and pressure regulator of the invention.

In the embodiment of the invention illustrated in the drawings, I have shown a gas supply and safety shut-off valve 10 of a type particularly adapted to control the flow of gas to the main and pilot burners of hot water heaters and the like. The valve may be strapped to the outside of a hot water tank or other device being heated, to maintain a thermostatic element 11 in contact with the wall of the tank.

The valve 10 comprises a valve body 12 having an inlet 13 leading thereinto, a pilot gas outlet 14 leading from said valve body and a pressure regulator fitting 15 secured to an open end portion 16 of said valve body and closing the open end thereof and having an outlet 17 leading therefrom, forming an outlet from said valve body.

Gas enters the valve body 12 through the inlet 13 into a chamber 19 having a port 20 leading therefrom to a chamber 21. The flow of gas from the inlet through the port 20 to the chamber 21 is controlled by a safety shut-off valve 23 engageable with a valve seat 24, defining the margin of the port 20 and biased into engagement with said valve seat by a spring 25. The safety shut-off valve 23 is held open by thermal electric current generated by the heat of the pilot flame and is shown as being a disk type of valve engaging the seat 24 on its face and having a stem 26 extending therefrom in a direction away from the seat 24 through the center of the compression spring 25 and suitably guided within the chamber 19. The stem 26 has an armature 27 engageable with an electromagnet 28 when setting the valve, for holding the valve open by thermal electric current generated by the heat of the pilot flame, and since these elements form no part of the present invention they are not herein shown or described further.

A reset button 29 on the outer end of the stem 30 is provided to open the valve 23 and hold the armature 27 thereof in engagement with the electromagnet 28 until the pilot has been lit and sufficient thermal electric current has been generated to hold the valve 23 open. The drive connection from the reset button 29 and plunger 30 to reset the valve 23 in its open position is in the form of a slide 31 slidably mounted within the chamber 21 and biased out of engagement with the valve 23 by a spring 32. Depression of the plunger 30 will, therefore, engage the end of the plunger with the inclined surface of the slide 31 and move the valve 23 into an open position and engage the armature 27 with the electromagnet 28.

The flow of gas through the pilot outlet 14 and the main gas outlet 17 is controlled by a main gas cock 33, herein shown as being in the form of a rotary plug valve operated by a knob 34 on the outside of the valve body 12. The gas cock 33 is rotatably carried in a frusto-conical seat 35 and has an open central portion 36 opening to the chamber 21. A port 37 leads from the open central portion 36 of the gas cock 33 and has communication with a pilot passageway 39 in the valve body 12 when the knob 34 has turned the gas cock 33 to its pilot position, for supplying gas to the pilot outlet 14 and the pilot burner. A second passageway 40 leads from the frusto-conical wall 35 to supply gas to a thermostatic valve 41 under the control of the thermal element 11 when the knob 34 is turned to its on position. As herein shown, the gas cock 33 is in its on position and supplies gas both to the pilot passageway 39 and the main gas passageway 40.

The thermostatic valve 41 is shown as being a snap acting valve of the disk type, facing the open end 16 of the valve body 12 and engageable with an annular valve seat 43, when the temperature to which the thermal element 11 is subjected reaches the operating temperature range of the valve.

The valve 41 is shown as being a resilient disk type of valve carried between two plates 44 and 45 of different diameters and mounted on a hollow stem 46. The plate of smaller diameter faces the valve seat 43 and accommodates the valve to engage said seat. An adjustable operating pin 47 is threaded in the hollow stem 46 and extends therethrough. The pin 47 has a reduced diameter end 49 extending through the center of a snap acting disk 50. The disk 50 abuts the shouldered portion of the pin 47 at its center and abuts at its edge an annular wire 51 carried on a shoulder 52 of a threaded retainer 53. The retainer 53 is shown as being threaded within the open end of the valve body. The valve 41 is biased into on open position and the pin 47 is maintained in engagement with the snap acting disk 50 by means of a compression spring 55 seated on a seat or shoulder 56 in the open end of the pressure regulator fitting 15, coaxial with the port 43 and spaced inwardly therefrom.

The opposite side of the snap acting disk 50 from the valve 41 is abutted by a fulcrum member 56 loosely carried on an operator 57 and abutted by three Belleville springs 59 in series. The Belleville spring 59 farthest away from the fulcrum member 56 is abutted by a snap ring 60 on the operator 57. A valve closing force is thus exerted on the fulcrum member 56 by the operator 49 through the Belleville springs 59 to accommodate the drive from the thermal element to be adjustable to vary the operating range of the thermostat without damage to the snap action mechanism, as shown and described in my application Serial No. 490,642, filed February 25, 1956, now Patent No. 2,825,507.

The thermal element 11 is shown as being a well known form of solid fill or power type of thermal element such as is shown and described in Patent No. 2,368,181 which issued to Sergius Vernet on January 30, 1945, and no part of the present invention so not herein shown or described in detail.

The thermal element 11 is retained to the valve body 10 by a retainer 63 threaded therein and has a cylinder 64 extending within the valve body, having a piston 65 extensible therefrom, as the temperature to which the thermal element is subjected reaches the operating temperature range of said thermal element. The power member or piston 65 abuts the end of an adjustment screw 66 threaded within a movable cage 67 guided in the valve body for movement along the axis of the piston 65. The cage 67 has a cam face 69 thereon, engageable with a ball 70 abutting the end of the operator 57 and guided in a sleeve 71 mounted in a wall 72 within the valve body. Extensible movement of the piston 65 will therefore depress the ball 70 and operator 59 to operate the fulcrum member 56 to snap the snap acting disk 50 overcenter and close the valve 41. A spring 73, interposed between the cage 69 and a rotatable adjusting member 74, is provided to return the power member 65 within the cylinder 64 and to accommodate the spring 55 to open the valve 41. The adjusting member 74 is rotatably carried within a cylindrical chamber 75 in the valve body 12 in axial alignment with the adjusting screw 66. The adjusting member 74 is rotatably turned by an adjusting knob 77 on the outside of the valve body, and turns the adjusting screw 66 through an interengaging drive connection 79, to vary the position of the cam face 69 with respect to the ball 70 and thereby vary the length of travel of the piston 55 required to close the valve 41, and the resultant temperature at which the valve 41 will close.

The pressure regulator fitting 15 is shown as being in the form of a casting having a shoulder 80 abutting a seal 81 on the open end 16 of the valve body 12 and sealing said fitting to the open end of said valve body. A suitable securing means, such as machine screws 83 may be provided to secure the pressure regulator fitting 15 to the open end of the valve body.

The pressure regulator fitting 15 is shown as having an interior wall 85, which with the outer wall of said fitting forms a passageway in communication with the seat 43. A port 86 leads through the wall 85 and affords communication with a chamber 87 having communication with the outlet 17. The inner wall of the pressure regulator fitting 15 defining the chamber 87 opens to a side of said fitting 15. The open end portion of said fitting and chamber is shown as being closed by a diaphragm 88 extending thereacross. The diaphragm 88 is sealed at its margin to the end portion of the fitting 15 extending about the chamber 88, as by a seal 89 and an end cap 90 abutting the outer side of the marginal portion of the diaphragm 88. The end cap 90 is vented, as indicated by reference character 91, to accommodate pressure in the chamber 87 to retractably remove the diaphragm 88 against a biasing spring 93. The spring 93 is seated at one end in the end cap 90 and at its opposite end on a diaphragm plate 95. The opposite side of the diaphragm 88 from the diaphragm plate 95 is abutted by a similar diaphragm plate 96. The two diaphragm plates 95 and 96 are retained to opposite sides of the diaphragm 88 by a stem 99 for a valve 100. The stem 99 has an intermediate shouldered portion 101 abutting the plate 96 and has a nut 103 threaded on the end thereof into abutting engagement with the plate 95. The stem 99 is shown as extending through the port 86 and as having the valve 100 formed integrally therewith, although said valve need not be formed integrally with said stem, but may be formed separately from said stem and suitably attached thereto, if desired. Access to the valve 100 and valve seat 85 is provided through an access plug 105 threaded in a wall 106 of the regulator fitting 15 and on the opposite side of said fitting from the end cap 90. The valve 100 is shown as being a poppet type of valve having a tapered valve face 106, cooperating with the port 86 to restrict the flow area thereof as the gas pressure increases, and to close said port upon excessive pressure conditions. Said valve operated by the pressure of gas on the diaphragm 88, therefore, serves to regulate the flow of gas through the outlet 17 in accordance with pressure.

It may be seen from the foregoing that the regulator fitting 15 forms a seat for the thermostatic valve 41 as well as an outlet from the valve body 12, that the valve 100 in series with the valve 41 serves to efficiently regulate the pressure of gas flowing through the outlet when the valve 41 is open and gas is required to heat a hot water heater or like device, and that the regulator fitting 15 aside from regulating the pressure of gas flowing through the outlet may serve as an adapter to accommodate the regulation of gas pressures of thermostatic valves.

It will be understood that modifications and variations in the present invention may be effected without departing from the spirit and scope of the novel concepts thereof.

I claim as my invention:

1. In a thermostatic gas valve, a valve body having an inlet therein and having an open end having communication with said inlet, a valve mounted in the open end of the valve body, a thermal responsive element operatively connected with said valve for closing said valve at a preselected temperature, an outlet fitting for said valve body having an outlet leading therefrom and having an open end for registry with the open end of said valve body, an annular seat for said valve in the open end of said fitting, spaced inwardly of the wall of said fitting, means securing said fitting to said valve body to close the open end thereof, a spring seated in said fitting inwardly of said valve seat and biasing said valve into an open position, a wall between the end of said fitting adjacent said seat and said outlet, a port affording communication between said seat and said outlet, a valve in association with said port, and a pressure responsive diaphragm operatively connected with said valve and subjected to the pressure of gas flowing through said outlet for regulating the pressure of gas flowing through said outlet.

2. In a thermostatic gas valve, a valve body having an inlet therein and having an open end having communication with said inlet, a valve mounted in the open end of the valve body, a thermal responsive element operatively connected with said valve for closing said valve at a preselected temperature, an outlet fitting for said valve body having an outlet leading therefrom and having an open end for registry with the open end of said valve body, an annular seat for said valve in the open end of said fitting, spaced inwardly of the wall of said fitting, means securing said fitting to said valve body to close the open end thereof, a spring seated in said fitting inwardly of said valve seat and biasing said valve into an open position, a wall between the end of said fitting adjacent said seat and said outlet, a port affording communication between said seat and said outlet, a pressure responsive diaphragm in said outlet fitting, on the side of said wall having communication with said outlet, a spring biasing said diaphragm in extended relation, a valve in association with said port on the opposite side thereof from said diaphragm, and a stem connecting said valve with said diaphragm, for operating said valve to regulate the pressure of gas flowing through said outlet in accordance with a predetermined normal gas pressure.

3. A pressure regulator valve fitting particularly adapted for gas hot water heater thermostats and the like having a thermostatically operated valve, comprising a body having an open end having an annular valve seat spaced inwardly of the wall thereof, a spring seat in axial alignment with said valve seat spaced inwardly from the open end of said valve body and forming a seat for a spring biasing said thermostatic valve away from said valve seat, a wall within said body dividing said body into inlet and outlet chambers, a port leading through said wall and connecting said chambers together, a diaphragm in said outlet chamber, a spring biasing said diaphragm toward said wall, a valve in said inlet chamber, and a stem leading through said port and connecting said valve with said diaphragm for moving said valve toward and from said port in accordance with the pressure of gas in said outlet chamber.

References Cited in the file of this patent

UNITED STATES PATENTS

| 2,620,132 | Carbonaro | Dec. 2, 1932 |
| 2,743,871 | Heiser | May 1, 1956 |

OTHER REFERENCES

"Sylphon Pressure and Vacuum Regulators," Bulletin Number 225, published by Fulton Sylphon Company, copyright 1930, page 10 relied on.